Sept. 27, 1966
E. DOPPELMAYR
3,274,954
CABLE OPERATING CONTROL MECHANISM
Filed April 27, 1964
3 Sheets-Sheet 1
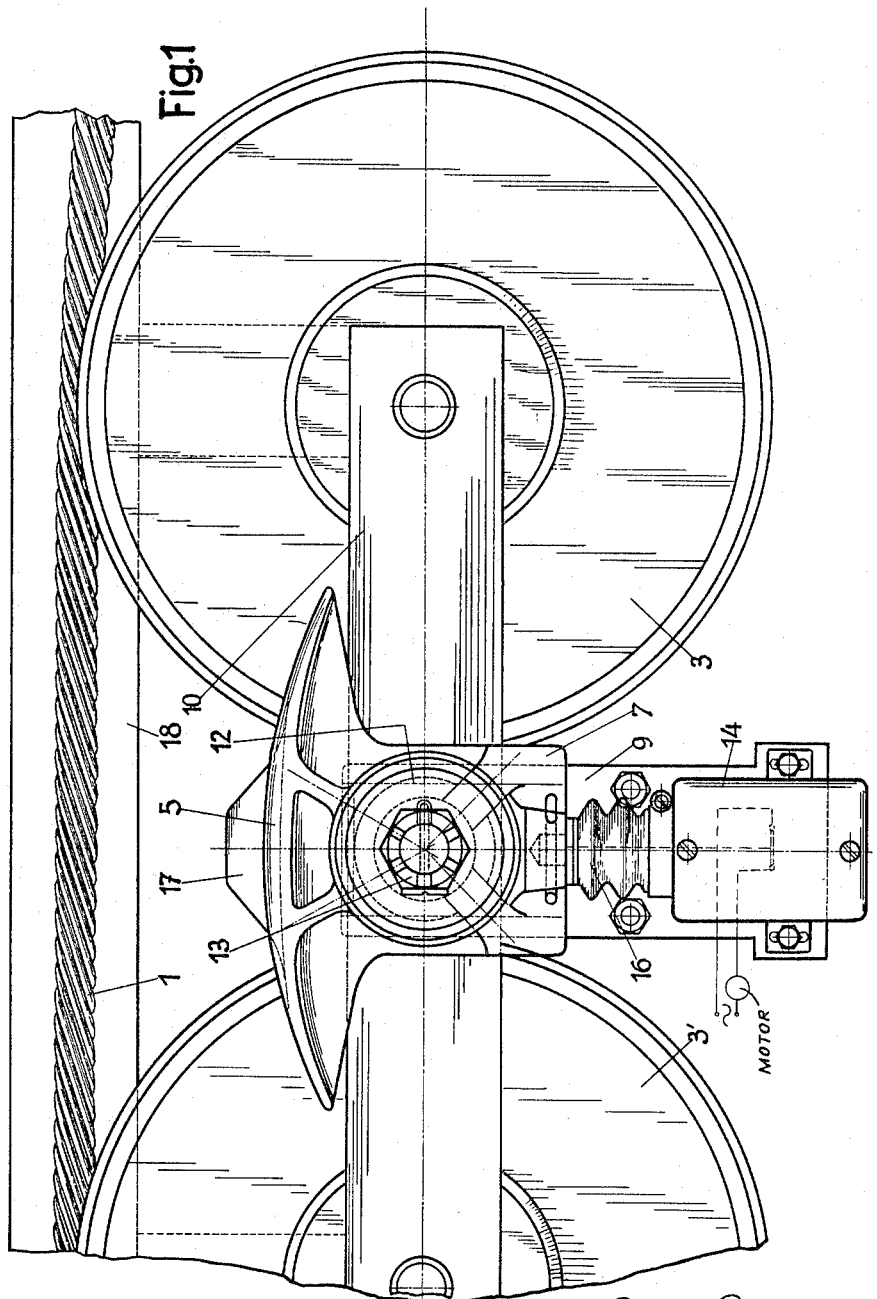
Emil Doppelmayr
INVENTOR.
BY Wenderoth, Lind
and Ponack, attorneys

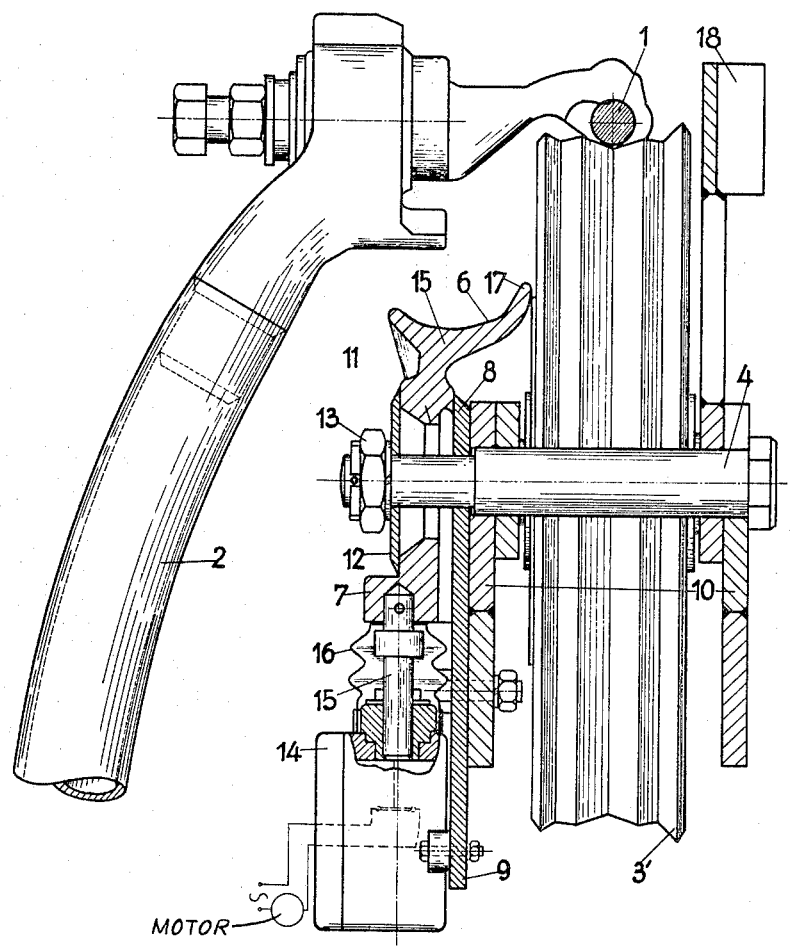

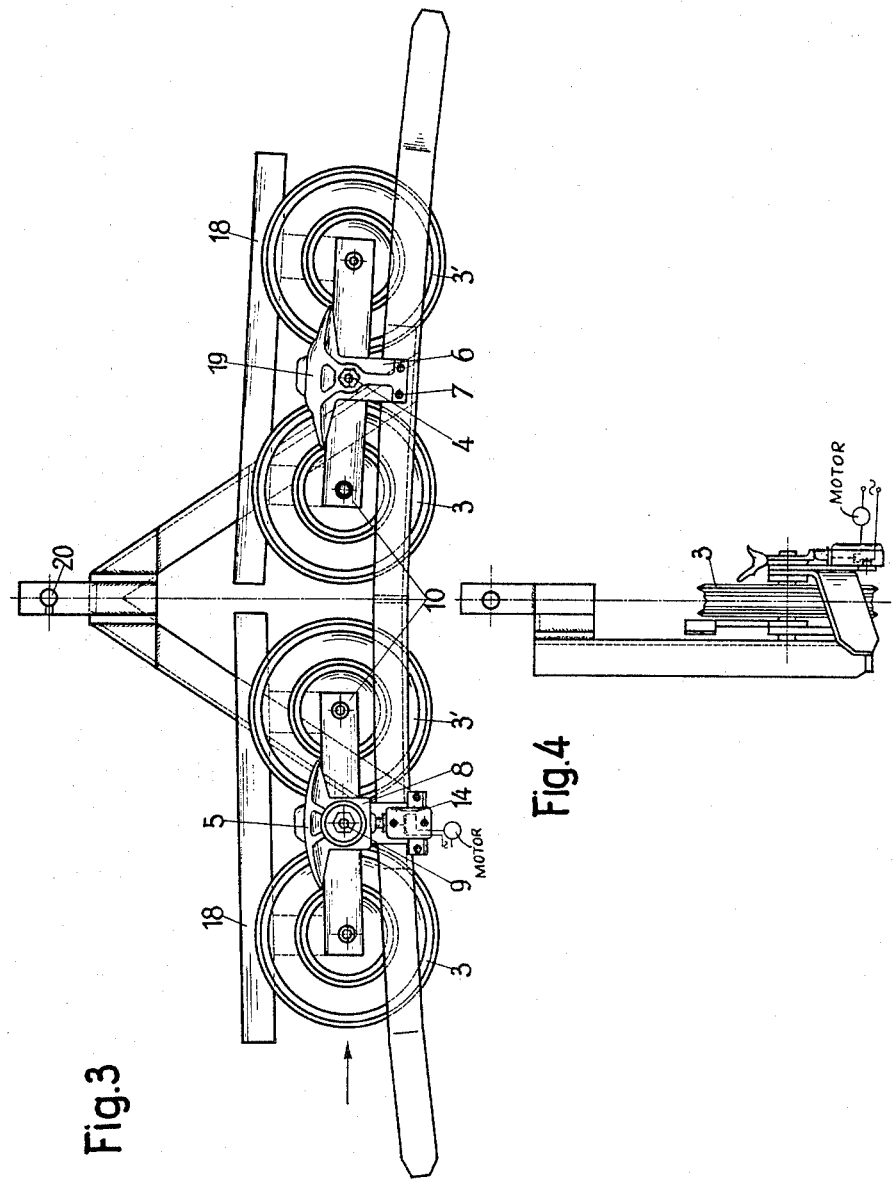

United States Patent Office 3,274,954
Patented Sept. 27, 1966

3,274,954
CABLE OPERATING CONTROL MECHANISM
Emil Doppelmayr, 10 Rickenbacherstrasse, Wolfurt, Vorarlberg, Austria
Filed Apr. 27, 1964, Ser. No. 362,673
Claims priority, application Austria, May 10, 1963,
A 3,834/63
11 Claims. (Cl. 104—178)

This invention relates to a cable control mechanism for ropeways, particularly monocable aerial ropeways, equipped with at least one rope support which is preferably arranged within the range of the cable guide roller alongside the normal path of the cable, and with an electric switch which is part of a circuit influencing the drive of the cableway plant.

It is the task of such devices to disconnect the power unit of a ropeway plant, if owing to any circumstances the cable slides from the cable guide roller, independently of whether this is a supporting or a holding-down roller. In an attempt to solve this problem a proposal has become known owing to which a roller battery is equipped at one end with rod-shaped lateral extensions projecting beyond it which catch the cable, if it slides from the rollers. The extension is rigidly supported in the uppermost frame. Several such frames arranged in series form together with the rollers the roller battery. If the cable slides from the rollers all frames are displaced by the weight of the cable acting now eccentrically to the suspension axis of the battery, whereby the bottom frame triggers a contact by means of a linkage. Apart from the expected, inertially delayed release of the contact the prior art device is not satisfactory in as much as it requires very long feed paths for releasing the contact. The linkage provided between bottom frame and switch is equally disadvantageous, since in the relatively rough operation of cableways such a linkage can be easily damaged and made unfit for further service. Especially, it should be pointed out that all swivel motions of the frame caused during service act on the cable linkage and can thus effect unintended switching actions, on the one hand, while very long and time-consuming feed paths must be overcome to trigger the actual switching process, on the other.

Apart from this, once the cable has slipped from the roller, it is not guided any longer and the suspension gear cannot slide over the extensions so that in this case parts of the plant are due to be destroyed.

It is an object of the invention to provide a device wherein the released cable triggers a switch disconnecting the power unit, while at the same time a certain guidance of the cable is still ensured.

According to the invention this is obtained in that the rope support is arranged movably on its support and is able to act directly and independently of oscillations and tilting motions of the suspension on the releasing member of the electric switch.

Owing to this advantageous design, the released and falling cable is caught by the rope support which is able to guide the cable independently of the type of suspension gear. The rope support is devised to take the full load of the released cable and even the clamping bodies attaching the suspension gears to the cable are able to slide over this rope support. By the released cable caught by the rope support, the rope support is shifted and/or rotated and the path covered by this shift or rotation is used for triggering a switch. The switch is connected to the control circuit of the power unit.

It is true that the arrangement of rope supports alongside the guide rollers is known, but the prior art rope supports are not at the same time triggering an electric contact for the control circuit of the power unit. The fact that according to this invention the releasing member of the cable safety switch and the rope support form a structural unit is an essential advantage of the invention over the prior art devices.

Based on the drawings enclosed, the invention is described without being restricted to the embodiments shown, and advantageous structural details are explained.

FIG. 1 shows in side elevational view twin supporting rollers shaped as a rocker, belonging to a ski lift.

FIG. 2 represents these twin rollers in a section through the swivel axis of the rocker, the top part of the suspension gear and the cable clamp being additionally shown in normal position.

FIG. 3 shows a side elevational view of a modified construction and

FIG. 4 is an end view of the construction shown in FIG. 3.

The hoisting cable 1 to which the suspension rod 2 of a towing gear or a chair is attached in a known way runs over the twin supporting guide rollers 3 and 3' designed as a rocker pivoting about the axis of the rocker pin 4. Alongside the two guide rollers 3 and 3', the rope support 5 is provided which can be displaced perpendicularly to its bearing area 6 and in parallel with the center plane of the cable rollers. The rope support 5 has an extension 7 at its bottom end. At the backside of this extension 7 a dovetailed tongue 8 is provided which slides in a corresponding groove of the bracket 9. This bracket is fixed on the cable roller frame 10. The extension 7 has a bore 11 through which the rocker bolt 4 passes with a clearance, this clearance being at least as great as the feed path required for triggering the electric contact. The bolt 4 carries a spring disk 12 which covers completely the bore 11 and is pressed against the extension 7 by means of the nut 13 screwed onto the bolt 4, so that the cable support is friction-locked with the cable roller frame 10, i.e. the cable support is firmly urged against the cable roller frame 10, i.e. the cable support is firmly urged against the cable roller frame 10 by the spring disk 12 and the nut 13.

On the bracket 9 the casing 14 is arranged which protects the electric contacts. Into this casing the tripping pin 15 connected with the extension 7 projects; this tripping pin is protected by the sealing bellows 16 against atmospheric influences and fouling and connects the casing 14 with the extension 7.

The rope support has a tongue 17 provided at the side of the cable rollers and inclined toward the rollers.

Since for structural reasons in chair-lifts and ski-tows a rope support can be only provided at one side of the cable roller, the roller frame 10 is upwardly extended on the other side, and in parallel with the cable axis a rail 18 is provided which reliably prevents the cable sliding from the roller at this side.

In normal service the cable runs over the rollers 3 and 3' of the rocker and the rope support 5 or its extension 7 is pressed by the elastic disk 12 and the nut 13 against the bracket 9. If the cable slides from the roller, it falls onto the rope support 5 and presses the latter downwardly. The trigger pin 15 moves into the casing 14 and operates the contacts so that the drive is stopped. Since, because of the rather great mass of the mobile parts, a certain time elapses between the triggering and the standstill of the drive and the cable continues to move during this period, the cable is guided to a certain extent in the rope support in spite of the fact that it has slipped from the guide rollers. Moreover, the cable clamp of the suspension gear is able to slide over this guiding means. The tongue 17 directs the falling cable onto the rope support.

For safety reasons one has desisted from providing a replacing member for the rope support so that the replacement can be effected in any case merely by hand.

Instead of a single rocker as shown in FIGS. 1 and 2, evidently a roller battery can be provided too; this is composed of several twin rollers arranged in series. Such a roller battery is shown in FIGS. 3 and 4 in which the parts corresponding to FIGS. 1 and 2 have been given the same reference numbers. The arrow indicates the direction in which the cable moves.

At both sides of an imaginary center plane going perpendicularly to the path of the cable through the suspension axis 20 of the battery rope supports 5 and 19 are symmetrically provided in such a way that the rope support 5 arranged at the incoming side acts directly on an electric contact. The rope support 19 is rigidly and immovably fixed to the frame 10.

The arrangement of the mobile rope support 5 at the incoming side is useful in as much as the slipping of the cable begins, as known from experience, always at the feed side of the roller battery so that, owing to the arrangement proposed in this invention, the power unit of the ropeway is very soon disconnected. The second fix rope support 19 provided symmetrically at the other side of the center plane prevents that the roller battery is unequally loaded, if the cable slides from the guide roller.

According to the embodiments described a vertical displacement of the rope support effects a triggering of the electric switch incorporated in the circuit of the driving motor.

The device is simple and solid and thus excellently suited to satisfy the rough operating conditions of cableways with inexpensive means.

What I claim is:

1. Cable control mechanism for an electrically driven aerial cable comprising a guide roller on said cable, a cable support adjacent said cable guide roller alongside the normal path of the cable for supporting said cable when it slips from said roller, an electric switch in the circuit for the drive of said cable mounted on said cable support, a frame for said roller, said cable support being movably mounted on said frame and relative thereto so that said cable support is able to act directly and independently of oscillations and tilting motions of said cable on said electric switch to stop the drive of said cable.

2. Cable control mechanism as described in claim 1 wherein two guide rollers are provided and said cable support and switch are arranged centrally on a rocker between said two guide rollers.

3. Cable control mechanism as described in claim 2 wherein said cable support is supported rotatably with respect to said guide rollers and said roller frame.

4. Cable control mechanism as described in claim 2 wherein said cable support is friction-locked with said frame.

5. Cable control mechanism as described in claim 1 wherein said cable support is provided at the side facing said guide roller with a tongue inclined toward said guide roller.

6. Cable control mechanism as described in claim 1 wherein said cable support is displaceable in parallel with the center plane of the roller.

7. Cable control mechanism as described in claim 1 wherein said cable support has an extension provided with guide grooves and is friction-locked with said frame provided with respective guiding elements by means of a bolt.

8. Cable control mechanisms as described in claim 7 wherein said extension has a bore through which a bolt passes with clearance, and a thin disk covering said bore is spring-clamped by means of a nut screwed onto said bolt.

9. Cable control mechanism as described in claim 7 wherein said extension is connected with a tripping pin operating said electric switch.

10. Cable control mechanism as described in claim 1 wherein several twin guide rollers are provided and said cable support directly operating said electric switch is associated with one of said twin guide rollers.

11. Cable control mechanism as described in claim 10 wherein said guide rollers are located at both sides of an imaginary plane going perpendicularly to the path of said cable through the suspension axis of said guide rollers and one cable support each is symmetrically provided and the cable support arranged at the incoming side acts directly on said electric switch.

References Cited by the Examiner

UNITED STATES PATENTS

| 3,071,083 | 1/1963 | Hochmuth | 104—178 |
| 3,115,847 | 12/1963 | Turner et al. | 104—178 |
| 3,140,670 | 7/1964 | Renninger | 104—178 |

FOREIGN PATENTS

| 1,199,721 | 6/1959 | France. |

ARTHUR L. LA POINT, *Primary Examiner.*

F. W. MONAGHAN, *Assistant Examiner.*